UNITED STATES PATENT OFFICE.

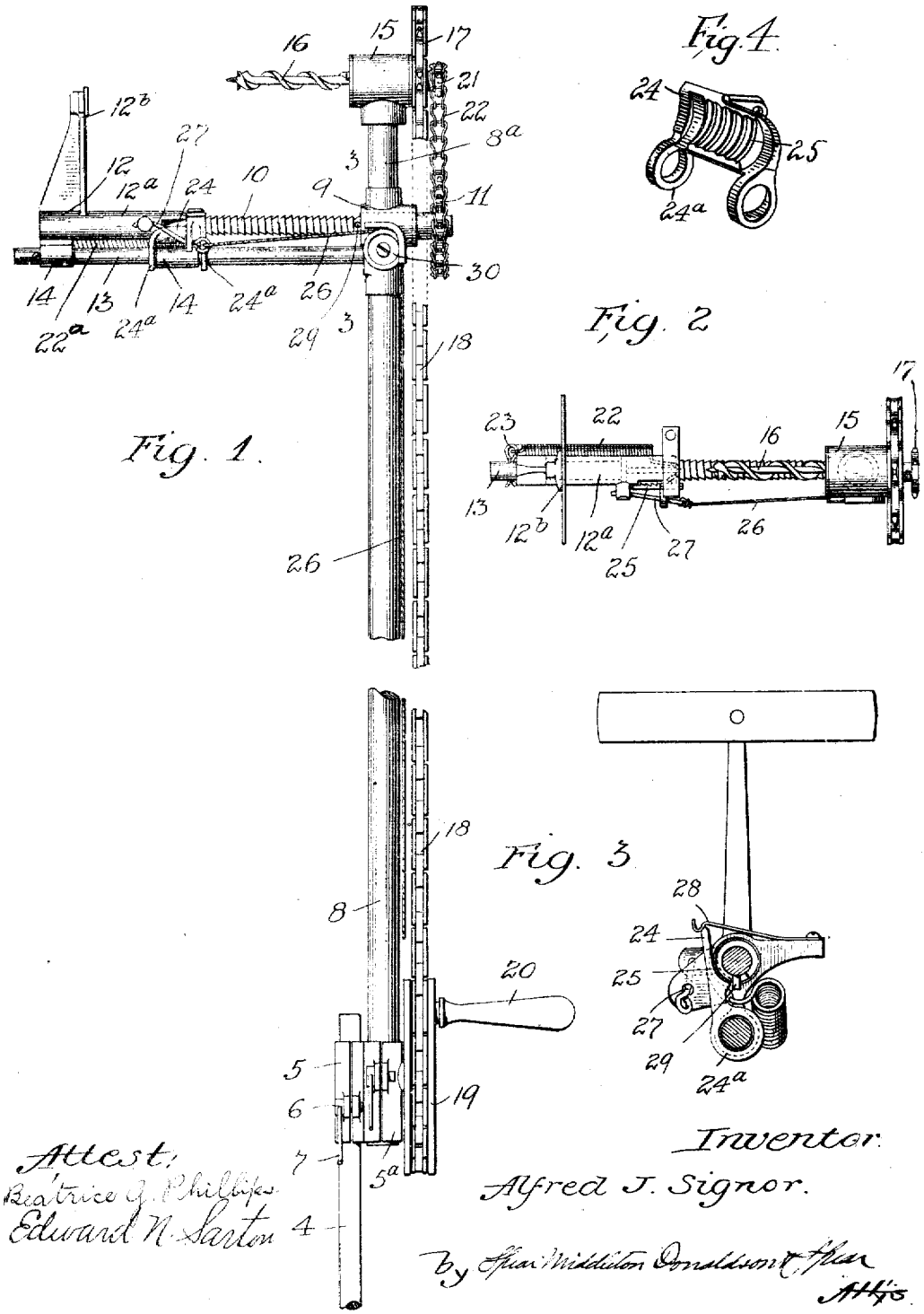

ALFRED J. SIGNOR, OF ELKHART, INDIANA.

BORING APPLIANCE.

No. 914,759.  Specification of Letters Patent.  Patented March 9, 1909.

Application filed July 2, 1907. Serial No. 381,845.

*To all whom it may concern:*

Be it known that I, ALFRED J. SIGNOR, a citizen of the United States, residing at Elkhart, Indiana, have invented certain new and useful Improvements in Boring Appliances, of which the following is a specification.

My present invention relates to improvements in boring appliances and is designed more especially for boring holes in overhead joists for running electric wires and the like.

The object of the invention is to provide a simple portable apparatus which may be easily and quickly operated, which shall be durable and efficient in operation, and practically automatic in its disengagement from the joist on the completion of the boring operation.

With these and other objects in view the invention includes the special features of construction and arrangement and combination of parts hereinafter described and particularly set forth in the appended claims.

A boring appliance embodying my improvements is illustrated in the accompanying drawings, in which,—

Figure 1 is a side elevation. Fig. 2 is a plan view and Fig. 3 a transverse section in proximity to the pawl-mechanism looking toward the left. Fig. 4 is a detailed view.

Referring more particularly and by reference characters to these figures, the numeral 4 designates a rod or standard upon which the parts are adjustably mounted by a coupling member which has a split tubular portion 5 slidably mounted on the standard and adapted to be clamped and released by a screw 6 having an operating handle 7. The coupling has a similar split tubular portion 5ª designed to be clamped in a like manner to a rod 8. The rod 8 is preferably made hollow or tubular in order to combine strength and lightness and has at its upper end a threaded or other suitable connection with the lower branch of a journal member 9, in which is journaled a feed screw 10 which is provided on one side of the journal member with a sprocket wheel 11 and on the other with screw threads as shown. These threads are adapted to engage with a tooth or teeth on a pawl member movable in unison with a feed carriage 12 slidably mounted on a rod or bar 13 projecting laterally from the member 9, the carriage having depending portions 14 slidably engaging the bar. An extension 8ª of the rod 8 above the member 9 carries at its upper end a second journal member 15 in which is journaled the shank of the boring tool or auger 16. The shank of this tool projects through the member 15 and has rigidly attached thereto a sprocket wheel 17 over which passes a sprocket chain 18 which also passes around a second sprocket wheel 19 journaled on a bearing projecting from the sleeve 5ª. The wheel 19 is provided with a handle 20 by which it may be turned to drive the auger. A small sprocket wheel 21 fast on the shank of the auger is engaged by a chain 22 which also passes around the wheel 11 and thereby drives the feed screw 10 though at a much reduced speed.

It will be understood of course that while I have shown and described chains and sprockets as the power transmitting means, these are intended to be representative of any means whereby movement may be transmitted from the operating member indicated by the wheel 19 and handle 20. The feed carriage 12 has a tubular portion 12ª into and through which the feed screw passes and an upwardly extending bearing arm 12ᵇ which presses against one side of the joist while the auger is penetrating from the opposite side, the upper end of the arm terminating on a line below the lower edge of the auger thus permitting the auger to clear the arm and avoid injuring the point thereof. The carriage is normally held in the extreme left hand position as shown in Fig. 1 by a helical spring 22ª extending between the forward end of the carriage and a split pin or eye bolt 23 in the outer end of bar 13.

A pawl member 24 has portions 24ª encircling the rod or bar 13 on each side of the depending part 14 so as to pivotally support said pawl member. Said pawl member is provided with one or more teeth 25 designed to engage with the threads of the feed screw.

With the parts in the position shown in Fig. 1, the instrument may be easily raised into position to bring the joist to be bored between the auger and arm. Then by means of a cord 26 attached to a lever 27 pivoted on the carriage and engaging the pawl, the said pawl may be raised to bring its teeth into engagement with the feed screw when it will be held by the spring latch 28 as shown in Fig. 3. Then as the handle 20 is operated and the auger rotated, the feed screw will be gradually screwed into the carriage forcing the auger into the joist. This will continue until the point of the auger has passed completely through the joist when a pin or projection 29 on the screw will come in contact with the pawl piece forcing it out of engagement with the spring catch 28 and disengaging the teeth from the threads when the carriage will be immediately drawn to the left by the spring 22ª, permitting the withdrawal of the auger from the joist. The pawl may be again engaged with the latch by the cord 26 which passes over pulley 30 and down into a convenient operating position.

Having thus described my invention, what I claim is:—

1. A boring appliance comprising a supporting standard, a boring tool journaled at the upper end thereof, a bar projecting laterally from the standard beneath the boring tool, a carriage movably guided on said bar, a feed screw journaled in the standard, means whereby the rotation of the feed screw moves said carriage on the bar, and means for simultaneously rotating the boring tool and feed screw, substantially as described.

2. A boring appliance comprising a supporting standard, a boring tool journaled at the upper end thereof, a horizontal supporting bar carried by the standard below the boring tool, a carriage guided thereon having a part for bearing against the article to be bored, a feed screw rotatably supported by the standard with its axis parallel to said bar, pawl mechanism for connecting the carriage with the feed screw, means for rotating the boring tool and feed screw, means for automatically disengaging the pawl from the screw on completion of the boring operation, a spring interposed between the end of the bar and carriage, and means for reëngaging the pawl and feed screw, substantially as described.

In testimony whereof, I affix my signature in presence of two witnesses.

ALFRED J. SIGNOR.

Witnesses:
JOHN T. DALTON,
CHESTER M. DOWELL.